Sept. 3, 1968  D. H. TRUMP  3,400,275
OPTICAL ENCODER HAVING A COMMON LIGHT SOURCE LOCATED
IN A ROTATABLE SHUTTERED HOUSING
Filed July 22, 1965  2 Sheets-Sheet 1
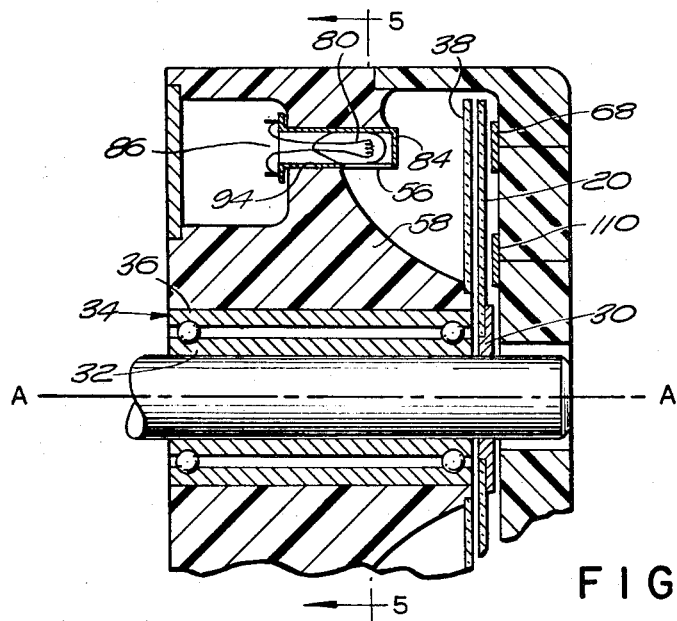
FIG. 1
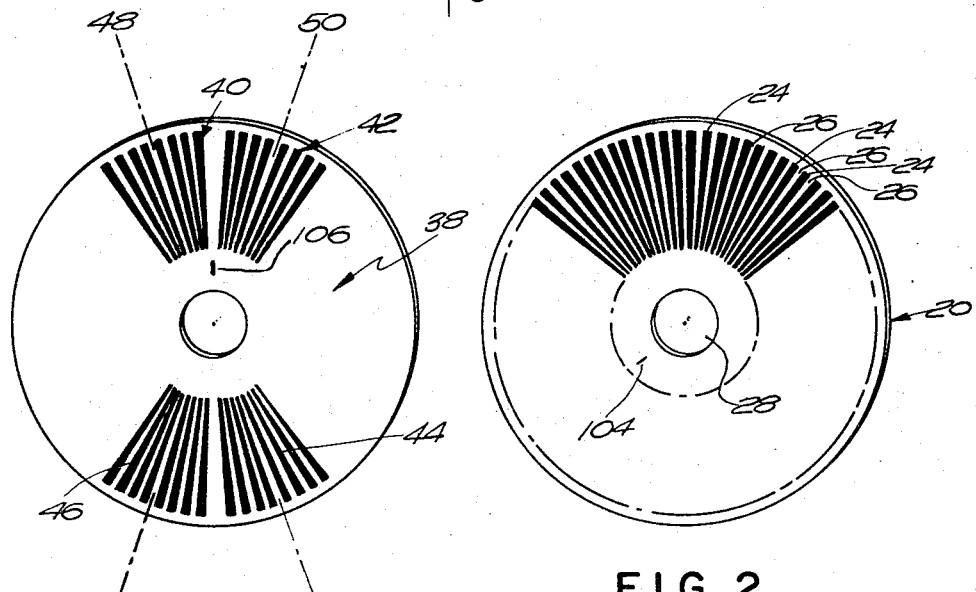
FIG. 3
FIG. 2
INVENTOR.
DENNIS H. TRUMP
BY
Robert J. Schiller
ATTORNEY United States Patent Office 3,400,275
Patented Sept. 3, 1968

3,400,275
OPTICAL ENCODER HAVING A COMMON LIGHT SOURCE LOCATED IN A ROTATABLE SHUTTERED HOUSING
Dennis H. Trump, Billerica, Mass., assignor to Trump-Ross Industrial Controls, Inc., Billerica, Mass., a corporation of Massachusetts
Filed July 22, 1965, Ser. No. 474,071
10 Claims. (Cl. 250—231)

ABSTRACT OF THE DISCLOSURE

A photoelectric encoder having a rotatable, radially segmented disc, and using photocell pairs in push-pull, each cooperating pair of photocells lying wholly to one side of the disc axis of rotation. Both photocells are illuminated by light derived from a common light source lying within a paraboloidal reflector, so that the collimation of the light and the balance of light intensities falling on the two photocells are adjustable respectively by axial and rotational movement of the light source with respect to the axis of the reflector.

---

The present invention relates to electromechanical transducers, and particularly to photoelectric shaft-encoding devices adapted for providing an electrical signal output indicative of angular shaft position, shaft velocity, or the number of revolutions of a rotatable shaft.

Photoelectric shaft-encoders are well-known in the art and usually are classified as absolute encoders when designed to indicate angular shaft position by a series of mutually unique coded output signals, or incremental encoders when capable of yielding an output signal in the form of a count or train of similar pulses, for example, thereby indicating the angular shaft velocity by the count rate. These shaft parameters are determined generally by a device having a rotatable disc connectable to and rotatable with the shaft, the disc being divided into an array or pattern of light transmissive and opaque portions. Another element, which may be disc shaped, is also provided having a fixed light transmissive and opaque pattern, which may be but a single slit. This latter pattern cooperates with the pattern on the rotatable disc in the modulation of one or more light beams. The modulated light, incident on a light-sensitive transduced or photocell, provides a comparably modulated electrical signal indicative of the described shaft parameter.

One typical shaft-encoder of the prior art employs a so-called moire pattern encoding technique, and specifically includes a rotatably mounted, circular encoder disc divided into alternate light-transmissive and opaque, equiangular sectors. A second circular disc is mounted with its center collinear with the axis of the rotatable disc, the planes of the two discs being parallel. The second disc is also divided into alternate light-transmissive and opaque equiangular sectors, but one more of each in number than the rotatable disc possesses.

Along a line parallel to the collinear disc axes and through respective points on the two discs adjacent their peripheries, light from a source will be transmitted to a photocell with a minimum intensity. Along a line through a pair of diametrically opposite points on the discs a maximum of light will be transmitted from a corresponding light source. Assuming the second disc is held stationary with respect to the light sources and photocells, rotation of the rotatable disc through the angle of a single sector will reverse the maxima and minima of light transmissions, i.e. the transmissiveness or change in light intensity transmitted will vary optically (or electrically if one considers the change in photocell outputs) 180°. For a 180° rotation of the rotatable disc, the number of changes or transmission reversals will be equivalent to the number of sectors on the rotatable disc. Photocells located at fixed positions intersecting the lines through the disc points will thus operate in push-pull, one cell providing maximum output when the other cell provides a minimum. If the cells are connected and poled in opposite senses, the output is substantially a triangular wave-form and two axis crossings will occur in the joint cell output for each sector angle through which the rotatable disc revolves. By providing another diametrically opposed pair of cells and pair of light sources, disposed at 90° about the periphery of the discs from the first pair of cells and light sources, and by connecting the second pair of cells appropriately to one another, one can obtain a pair of outputs wherein a total of four axis crossings occur for a rotation of the disc through one sector angle. By known techniques, axis crossings can be converted to electrical pulses, thereby providing a direct digital value output. A device of this type is typified by that disclosed in U.S. Patent 3,096,444 to H. H. Seward.

While moire pattern transducers of this variety have distinct advantages over other types of encoders, they are often difficult to adjust properly. For example, the electrical output can exhibit so-called DC or amplitude asymmetry usually due to differences in the maximum light intensities transmitted to respective diametrically opposed photocells, or due to a lack of balance between the responsiveness of opposed photocells. Similarly, it will be apparent that the phase difference between the outputs of diametrically opposed cells must be 180°, and errors in sector angularity or nonparallelism of light transmitted to opposed cells will cause axis crossings to occur at other than precisely 180° intervals per sector period (i.e. the rotation of the rotatable disc through an angle equal to the angular width of a pair of adjacent light transmissive and opaque sectors). This error, which results in an "asynchronous" pulse output is known as phase or AC asymmetry.

It is therefore a principal object of the present invention to provide a novel electromechanical shaft transducer which is inherently easy to correct for asymmetries.

Other objects of the present invention are to provide such a shaft transducer which, although simple, can yield an accurate electrical output representative of shaft parameters; and to provide a photoelectric shaft transducer having a small number of optical parts.

Generally, to effect the foregoing and other objects the present invention is embodied in a shaft transducer having a rotatable shaft, a first disc mounted on the shaft for rotation therewith and wholly divided into like pluralities of alternately, relatively light-opaque and transmissive equiangular sectors, and a plate mounted adjacent and substantially parallel to the first disc. The plate is provided with at least two arrays of alternately light opaque and transmissive equiangular sectors so dimensioned and disposed relative to the sectors of the disc that when one such array is positioned to cooperate with the disc to permit maximum light transmission therethrough, the other array is positioned to cooperate with the disc to permit minimum light transmission. Both arrays are disposed wholly to one side of a line in the plane of the plate and perpendicular to the shaft axis. Means are provided on one side of one of the disc and plate for projecting light from a single light source toward both arrays, and photoelectric transducer means are associated respectively with each of the arrays for measuring light passing through the disc and the corresponding array. The light source is provided so as to be movable with respect to the projection means whereby the ratio of light intensities, or the collimation of the light, or both, respectfully provided to the arrays can be altered.

Other objects of the invention will in part be obvious and will in part appear hereinafter. The invention accordingly comprises the apparatus possessing the construction combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 is a schematic cross-section through a side-elevation, partly in fragment, of an exemplary device embodying the principles of the present invention;

FIG. 2 is a front elevational view of a rotatable disc for the device of FIG. 1;

FIG. 3 is a front elevational view of an optical plate for use with the disc of FIG. 2 and forming a part of the embodiment of FIG. 1;

Figure 4:
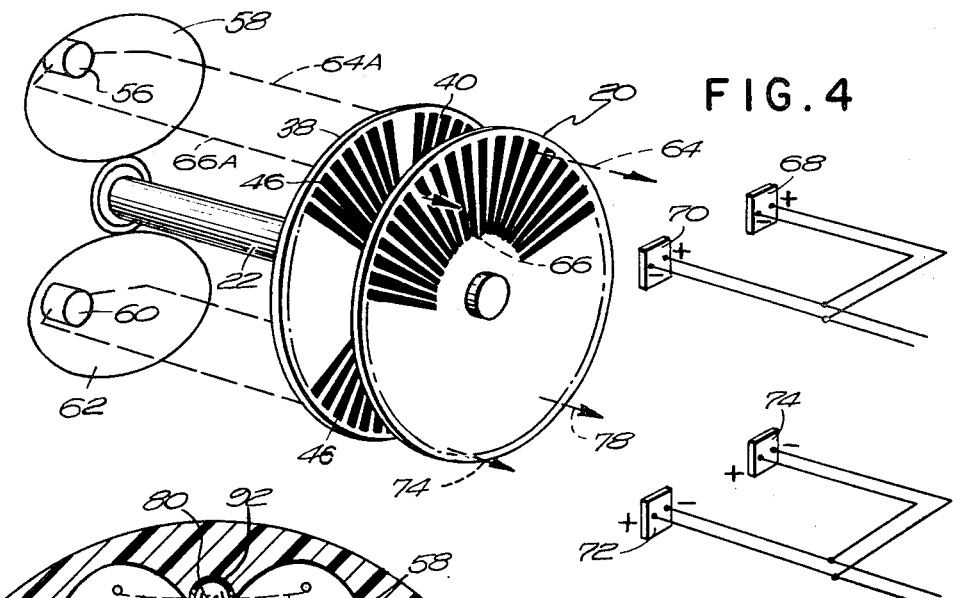
FIG. 4 is an enlarged, exploded, perspective view, partly schematic showing the relation to one another of certain elements of the embodiement of FIG. 1.

Referring now to the drawing, there is shown in FIG. 1 a schematic embodiment of the invention including a first, substantially circular thin disc 20 centrally mounted on and for rotation with shaft 22 substantially in the plane of the disc. Disc 20 is formed of light transmissive, dimensionally stable material, such as glass, a clear polymeric material, typically a methacrylate ester, or the like. As shown in detail in FIG. 2, disc 20 is wholly divided into a pair of like pluralities of radially directed equiangular sectors 24 and 26 alternating with one another, the sectors of one plurality being more light transmissive than the sectors of the other plurality. Preferably, sectors 24, for example, are opaque, sectors 26 then being transparent, or at least translucent. Division of disc 20 into an integral number of alternating opaque and transmissive equiangular sectors is readily accomplished by known techniques such as photolithographic methods and the like. Disc 20 includes central opening 28 through which shaft 22 extends so that disc can be mounted on the latter by means such as flanged hub 30 secured to both the disc and shaft.

Shaft 22 is mounted in internal sleeve 32 of a preloaded bearing pair 34, preferably of the doublex-type. Mounted on paraboloidal reflector body 58 is thin plane plate 38, shown for convenience in the form of a second substantially circular thin disc. The latter is mounted with its central axis collinear with the central axis of disc 20 and with the planes of the two discs closely adjacent and substantially parallel to one another.

Referring particularly to FIG. 3, plate 38 is shown in plan view divided into a plurality of discrete arrays of sectors. Each array is formed of a number of alternately light transmissive and opaque, equiangular, radially directed sectors. Plate 38 includes at least two associated arrays 40 and 42 preferably having the same number of sectors as one another, the two arrays being disposed in one common segment or portion of plate 38, which segment is not larger than a hemicircle of the disc in angular dimension. In the form shown plate 38 also includes another pair of arrays 44 and 46 disposed in the other hemicircular portion of disc 38.

For clarity in the drawing, each array of sectors on plate 38 is shown as comprising eight opaque sectors interlineated with seven transparent sectors, all of which are equiangular. Each array is separated from an adjoining array by a sector (either transmissive or opaque) preferably much greater in angular width than the sectors of the arrays. It will be apparent that while the number of sectors per array is preferably the same, it is largely an arbitrary number. The arrays thus can be considered to have radial axes of symmetry, respectively 48, 50, 52, and 54 for arrays 40, 42, 44, and 46. As will be detailed hereinafter, each pair of associated arrays, such as arrays 40 and 42, are positioned so that their respective sectors are 180 electrical degrees out of phase with one another referred to the sectors of disc 20. The sectors of the other pair of associated arrays 44 and 46 are similarly 180 electrical degrees out of phase with one another.

Means are provided for directing a pair of light beams from a single source along respective paths through disc 20 to a corresponding pair of associated arrays of plate 38. Thus, particularly as shown in FIG. 4, there is included first light source 56 mounted in paraboloidal reflector 58. The latter, mounted on bearing sleeve 36, is substantially rigidly coupled to plate 38, for directing light from source 56 substantially normally to the plane of plate 38 in the form of a pair of beams respectively incident upon arrays 40 and 42. Because reflector 58 need only provide the pair of appropriately collimated light beams through the adjacent appropriate arrays of disc 38, it can therefore be disposed wholly to one side of shaft 22 or an extension of the longitudinal axis A—A thereof. Similarly, there is included in the form shown, second light source 60 mounted in paraboloidal reflector 62 for directing a pair of light beams perpendicularly upon arrays 44 and 46. Reflector 62 thus is disposed to the other side of axis A—A.

A description of the operation of the embodiment thus described will be helpful in delineating the inventive concepts involved. As shaft 22 rotates, disc 20 is rotatably carried therewith. The rotation of disc 20 can be described in terms of the number of sector periods, i.e., the angle subtended by an adjoining pair of opaque and transmissive sectors of disc 20. Thus, if disc 20 is wholly divided into N transparent and N opaque equiangular sectors a sector period will be 360°/N. It can be assumed that the beginning of a sector period can be defined or referenced to a fixed position in which the transmissive and opaque sectors of disc 20 are respectively congruent with corresponding transmissive and opaque sectors of an array such as 40 of plate 38, i.e., the respective sectors of the disc and that array of the plate permit a maximum of light from source 56 to pass therethrough as shown in FIG. 4, as light vector 64. Because the sectors of array 42 are 180 electrical degrees out of phase with the sectors of array 40, the sectors of array 42 are disposed with respect to its corresponding sectors on disc 20 such that only minimum light intensity (shown as vector 66 which can be substantially zero) is allowed to pass through the disc and plate at array 42.

As disc 20 rotates through a sector period, vector 64 moves toward a minimum whilst vector 66 grows toward a maximum. Thus, the light from source 56, split by reflector 58 into two beams substantially parallel to one another and to axis A—A of shaft 22, is modulated by the relative cooperation between the sectors of disc 20 and arrays 40 and 42 of plate 38.

As means for sensing this modulation of light, the transducer includes photoresponsive means in the form, for example, of silicon photovoltaic cells 68 and 70 respectively positioned in the path of vectors 64 and 66. The response of each cell to the changes of light flux, in theory provides a triangular waveform, but in practice, optical effects such as diffraction and the like, round the waveform until it is quasi-sinusoidal. Cells 68 and 70 are electrically connected to one another in push-pull, i.e., with terminals of opposite polarities coupled. Thus, because arrays 40 and 42 are electrically 180° out of phase, the signal maxima occurring at the output of cells 68 and 70 occur sequentially 180 electrical degrees apart and in opposite polarity, thus providing combined electrical signal which is substantially a full sinusoid having a pair of axis-crossings separated by 180° for each sector period through which disc 20 rotates. It will be apparent that the actual physical angular spacing between axes of symmetry 48 and 50 is limited only by the requirement that the two arrays 40 and 42 be disposed wholly to one side of the axis A—A, and that the corresponding sectors of the two arrays, referred to the sectors of disc 20, be 180 electrical degrees out of phase with one another. For example, assuming each array subtends a total angle of 10°, then their axes of symmetry can be angularly disposed with respect to one another between somewhat less than 170° to somewhat more than 10°. In a preferred embodiment, the array of a pair are disposed with their angles of symmetry about 35° apart.

It will be appreciated that the output signal from cells 68 and 70 has a fundamental frequency of N per shaft revolution of disc 20 having N/opaque sectors. If the output signal is being employed to provide a digital indication of the shaft rotation, then it is usual to derive digital pulses according to the axis crossings or polarity transitions of the joint cell output; in such instance, the digital repetition rate would be 2N per shaft revolution. The embodiment of the invention shown is intended to provide 4N pulses per shaft revolution, and to this end arrays 44 and 46 are disposed in the opposite hemicircular segment of the disc of plate 38 and the sectors of array 44 are disposed to be 180 electrical degrees out-of-phase with the corresponding sectors of array 46 as referred to the sectors of disc 20. Array 44 is preferably position to be 90 electrical degrees out of phase with array 42 and thus array 46 is 270 electrical degrees out of phase with the latter. As shown in FIG. 4, photocells 72 and 74, electrically connected in push-pull, are respectively disposed in the path of the light vectors 76 and 78 transmitted by respective arrays 46 and 44 cooperatively with the sectors of disc 20. These light vectors arise from a pair of beams directed by reflector 62 from unitary light source 60 in substantial parallelism to one another and to axis A—A, and incident upon arrays 46 and 44. It will be apparent that the assembly of reflector 62, source 60, cells 72 and 74 can be full counterparts of reflector 58, source 56, and cells 68 and 70.

Much as hereinbefore described in connection with the output of cells 68 and 70, cells 72 and 74 provide a joint output in the form of a quasi-sinusoid responsively to modulation of light from source 60 by arrays 44 and 46 cooperating with the sectors of disc 20°. The joint output sinusoid of cells 72 and 74, being 90 electrical degrees out of phase with the output of cells 68 and 70, can be joined in known manner with the latter output to provide pulses indicative of four equally spaced intensity changes per revolution through a sector period, or 4N pulses per shaft revolution.

Figure 5:
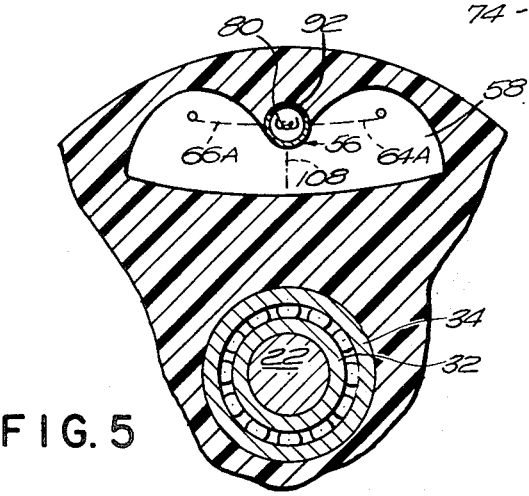
FIG. 5 is a cross-sectional view taken substantially along the line 5—5 of FIG. 1.

The disposition of arrays, for example 40 and 41, so that they are 180 electrical degrees apart (although physically disposed within an angular segment of plate 38 of less than 180°) confers a marked advantage upon the present invention in that the two arrays can readily be illuminated with a pair of beams derived from but a single source. And a unique advantage is achieved by the use of a paraboloidal reflector as means for deriving the two beams from the single source. As shown particularly in FIGS. 5 and 9, reflector 58 is a concave surface which is a segment of a paraboloid of revolution. Assuming light source 56 to be a point source of light, when source 56 is disposed at the focus of the concave surface of reflector 58, (i.e. the intersection of the latus rectum plane and the axis of revolution of the paraboloid) light reflected from points on the surface of reflector 58 will be substantially parallel everywhere to the axis of the surface, or fully collimated. Thus, as shown in FIGS. 4 and 5, by disposing light source 56 at the focus of reflector 58 one readily obtains at least two beams of collimated light, exemplified by rays 64A and 66A directed respectively at arrays 40 and 42.

Figure 6:
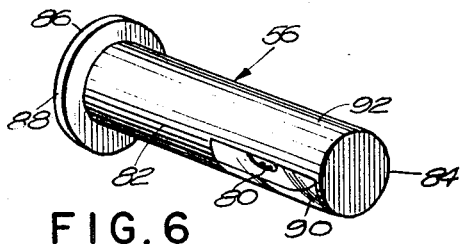
FIG. 6 is a perspective view of the light source of the embodiment of FIG. 1.

As shown particularly in FIG. 6, light source 56 (which is also exemplary of source 60) comprises source element or bulb 80, for example of the incandescent filament type, and housing 82. The latter is in the form of a cylinder having one end 84 closed and the other or open end 86 peripherally surrounded by upstanding flange 88. Housing 82 is substantially opaque to light from bulb 80 except at window 90, preferably formed in the cylindrical wall of the housing adjacent closed end 84. Window 90 extends peripherally about housing 82 preferably more than halfway, an opaque portion, or mask 92, of the housing wall, completing the area between the circumferential ends of the window. Typically, housing 82 is formed as an integral unit of opaque plastic, except for the portion constituting window 90. Bulb 80 is positioned with its filament (or approximate point light source) adjacent the approximate center of window 90.

Housing 82 is mounted in a cylindrical bore 94 extending coaxially along the axis of reflector 58 and through from the paraboloidal front surface to a back surface of the reflector, as shown in FIG. 1. Bore 94 and housing 82 are respectively dimensioned in diameter so that the latter fits snugly but slidingly within the former. The housing is sufficiently longer than the bore so that the flanged end of the housing extends well out of the back surface of reflector 58 when window 90 is adjacent the focus of the front or paraboloidal surface of the reflector. The combination of reflector and light source thus described, when used in conjunction with the sector arrays of plate 38 and fixedly oriented with respect to the latter and the photocells, constitutes means for simply and readily adjusting the transducer to overcome both D.C. and A.C. asymmetries.

Figure 9:
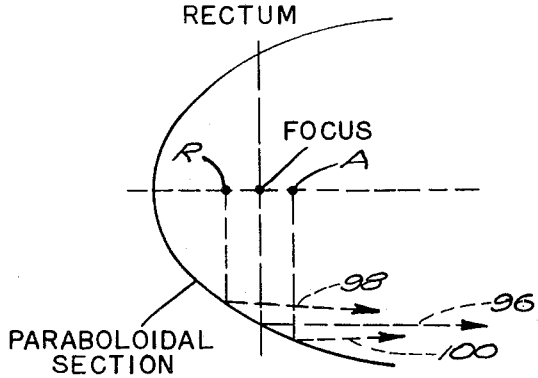
FIG. 9 is a schematic diagram illustrating various other positions of the light source of the invention, correcting for certain errors.

For example, assuming that an A.C. asymmetry exists, probably due to a constant "phase error" in the formation of the arrays on plate 38. It will be apparent that if plate 38 has no such error and is superimposed appropriately with disc 20 so that parallel beams of light are incident normally upon arrays 40 and 42, the sectors of array 40 should be exactly 180° electrically out of phase with the sectors of array 42 when referred to the sectors of disc 20. If the light beams are now made non-parallel, the electrical phase angle will change. Conversely. if the sectors of the array are out of phase by more or less than 180° electrically when parallel beams are employed, the electrical phase angle can be corrected to 180° by making the light beams non-parallel, i.e. divergent or convergent through a solid angle with respect to one another. In the present invention, this can be simply accomplished by moving housing 82 axially along bore 94. As seen in FIG. 9, if the approximate point source of light provided by bulb 80 is at the focus F of the paraboloidal surface of the reflector, light therefrom will be reflected substantially parallel to the axis as shown by ray 96. If the housing is axially moved so that the point source lies at position R in FIG. 9 (i.e. between the focus and reflecting surface) the reflected rays, exemplified by ray 98, will become divergent as is well known. Similarly, sliding the housing outwardly so that the point source of light lies outside the plane of the latus rectum, as at A, causes the reflected rays to become convergent as shown by ray 100. Thus, by moving or translating the light source housing along the axis of revolution of the reflector, A.C. asymmetries can be reduced. The photoactive area of each photocell exposed to incident light from the reflector through disc 20 and the plate preferably is limited so that its maximum dimension is less than about ⅓ of the length of the latus rectum of the paraboloidal surfaces of the reflector, thus insuring that the photocell will respond quite fully to collimation changes due to translation of the light source.

Figure 7:
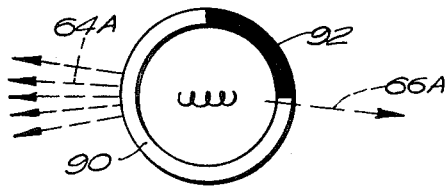
FIG. 7 is a schematic diagram showing the light source of FIG. 5 in a first position to correct transducer imbalance.
Figure 8:
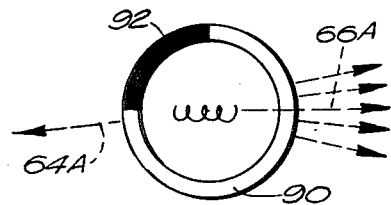
FIG. 8 is a schematic diagram showing the light source of FIG. 5 in another position of correcting.

As previously noted DC asymmetry in shaft encoder output is due largely to imbalances between the responsivenes of the paired photocells, the ratio of maximum (or minimum) light intensities falling on the cells, or the like. DC asymmetries are readily reduced simply by rotating the housing of light source 56 through a finite angle. For example, as shown in FIG. 5, filament 80 provides light for beams (exemplified by rays 64A and 66A) of substantially equal intensities, if window 90 is equally open to both beams and mask 92 is positioned along a bisector to the angle made by the two beams emergent from filament 80. The ratio of light distribution is altered by rotating the housing clockwise to a position as in FIG. 7 or counterclockwise to a position as in FIG. 8, respectively reducing the incident light from beams 66A and 64A (shown graphically by the relative number of broken line arrows) by an amount proportionate to the extent to which mask 92 is moved into a position of partially blocking the appropriate beam.

Upon rotating disc 20 at a fixed speed, and observing the output signal from photocells 68 and 70 by known techniques, such as with a cathode ray oscilloscope, corrections made by manipulating housing 82 can be easily effected. Once the photocell pair provides a symmetrical output, the housing can be locked into the reflector body, for example simply by dropping a small amount of cement such as an epoxy resin, between flange 88 and the back surface of the reflector.

So that each pair of light beams, pair of sector arrays and photocells can be substantially fixedly oriented with respect to one another, the photocells are mounted on cover 102 which in turn is fixed to the body of reflector 58. The other photocells are likewise mounted, preferably on the same single cover which is coupled to the appropriate reflector. Leads 104 are provided for connecting the photocell through the cover to supplementary electrical equipment. For simplicity and clarity in exposition, certain desirable or obvious elements, being well-known in the art have been omitted from the detailed description of the invention, such as the obvious electrical connections for energizing bulbs 80, the well-known electrical devices desired for determining the axis-crossings and providing pulses responsive to each axis crossing, the known electrical logic circuit for combining the pulse trains derived from each photocell pair so as to yield a "four-count" digital output, and the like.

It will be appreciated by those skilled in the art that incremental shaft encoders of the type described herein require that the output pulses be numerated in a digital counter to indicate for example, shaft angle. Thus, the counter may be referenced to or set at zero by use of an indexing signal provided by the encoder at the arbitrary zero position of the shaft. To this end, the encoder preferably includes means for establishing a zero-position signal. A simple structure accomplishing this purpose is provided by disposing a single transmissive slit element 104 on rotatable disc 20 and single element slit 106 on plate 38 both of which, when congruent and illuminated by a collimated beam 108 from light source such as 56, permit stimulation of another photocell 110, thereby to generate a "zero" signal. Other systems for generating a "zero" signal can be used such as the staggered multiple slit system exemplified by U.S. Patent 3,187,187 issued June 1, 1965 to Sidney A. Wingate. It will be seen that by positioning single element slit 106 between a pair of arrays such as 40 and 42 on a track of different radius than the arrays, the arrays and slit can be illuminated with respective light beams all arising from the single light source 56.

Since certain changes may be made in the above apparatus without departing from the scope of the invention herein involved it is intended that all matter contained in the above description or shown in the accompanying drawing shall be interpreted in an illustrative and not in a limiting sense.

I claim:

1. In an optical shaft encoder of the type having a rotatable disc divided into a plurality of substantially equiangular alternately light opaque and transmissive sectors; a plate positioned in a plane substantially parallel to said disc and having at last a pair of discrete arrays of alternately opaque and transmissive sectors equiangular with sectors of said disc, each pair of arrays being disposed radially with respect to the axis of said disc such that the transmissive sectors of one array are registrable with a like number of transmissive sectors of said disc, and the transmissive sectors of the other array are simultaneously registrable with a like number of opaque sectors of said disc;
said pair of arrays being disposed within an angular portion of said plate of less than 180° about said axis;
a common light source for illuminating said arrays with collimated light;
means for projecting light from said source through said arrays and onto said disc;
means for masking said light source and being mounted for rotation for varying the ratio of light quantities incident on said arrays; and
means responsive to light from said beams transmitted through said arrays and disc for providing an electrical signal.

2. An optical shaft encoder as defined in claim 1 including means for varying the collimation of said light.

3. An electro-mechanical transducer comprising, in combination;
a rotatable disc divided wholly into a plurality of substantially equiangular, alternately light opaque and transmissive sectors;
a plate positioned in a plane substantially parallel to said disc and across the axis of rotation of the latter, said plate having at least a pair of discrete arrays of alternately opaque and transmissive sectors;
said pair of arrays being disposed within an angular sector of said plate of less than 180° about said axis;
the sectors of one array being 180 electrical degrees out of phase with the sectors of the other array, referred to the sectors of said first disc;
a common light source;
means for directing light from said source so as to be respectively incident upon and through the transmissive sectors of corresponding arrays and onto congruent sectors of said first disc, said means being substantially spatially fixed relative to said arrays;
means for masking said source and being mounted for rotation relative to said light directing means so that the ratio of quantities of light respectively incident on said arrays is set according to the rotational position of said masking means;
and light responsive means positioned in the path of said beams as selectively transmitted through said disc and plate.

4. An electro-mechanical transducer as defined in claim 3 wherein said means for directing said light is a paraboloidal reflector.

5. An electro-mechanical transducer as defined in claim 4 wherein said light source is positioned substantially on the axis of revolution of said reflector and said masking means is rotatable about said axis.

6. An electro-mechanical transducer as defined in claim 5 wherein said light source is mounted for axial adjustment along said axis of revolution through the focus of said reflector.

7. An electro-mechanical transducer as defined in claim 5 wherein said masking means comprises a substantially light-opaque housing having a light transmissive portion in a wall thereof, said source being disposed within said housing adjacent said portion, said housing being mounted in said reflector for rotation of said portion about said axis of revolution.

8. In an optical shaft encoder of the type having a rotatable disc divided into a plurality of substantially equiangular alternately light opaque and transmissive sectors;
   a plate positioned in a plane substantially parallel to said disc and having at least two pairs of discrete arrays of alternately opaque and transmissive sectors equiangular with sectors of said disc, the pairs of arrays being disposed radially with respect to the axis of said disc such that when the transmissive sectors of one array of one pair are registered with a like number of transmissive sectors of said disc, the transmissive sectors of the other array of said one pair are registered with a like number of opaque sectors of said disc, and the sectors of the arrays of the other pair are both half registered with a like number of transmissive sectors of said disc;
   said one pair of arrays being positioned wholly within a first 108° sector of said plate about said axis, said other pair of arrays being positioned wholly within the other 180° sector of said plate about said axis;
   a first substantially point source of light disposed to one side of said axis;
   means for directing light from said first source as a first substantially collimated light beam for transmission respectively through said one pair of arrays and said disc approximately parallel to said axis;
   a second substantially point source of light disposed on the opposite side of said axis;
   means for directing light from said second source as a second substantially collimated light beam for transmission respectively through said other pair of arrays and said disc approximately parallel to said axis;
   means responsive to light transmitted in said beams through said disc for providing output signals,
   first means for masking said first source and being mounted for rotation for varying the ratio of light quantities respectively incident on the arrays of said one pair of arrays and
   second means for masking said second source and being mounted for rotation for varying the ratio of light quantities respectively incident on the arrays of said other pair of arrays.

9. In an optical shaft encoder of the type having a rotatable disc divided into a plurality of substantially equiangular alternately light opaque and transmissive sectors;
   a plate positioned in a plane substantially parallel to said disc and having two pair of discrete arrays of alternately opaque and transmissive sectors equiangular with sectors of said disc, the pairs of arrays being disposed radially with respect to the axis of said disc such that the transmissive sectors of one array of one pair are registrable with a like number of transmissive sectors of said disc and the transmissive sectors of the other array of said one pair are simultaneously registrable with a like number of opaque sectors of said disc and simultaneously the sectors of the arrays of the other pair are both half registered with like number of transmissive sectors of said disc;
   said one pair of arrays being positioned wholly within a first 180° sector of said plate about said axis, said other pair of arrays being positioned wholly within the other 180° sector of said plate about said axis;
   first and second substantially point sources of light disposed on opposite sides of said axis;
   first and second paraboloidal reflectors disposed on opposite sides of said axis of said disc and having their axes of revolution parallel to said axis of said disc, said first and second light sources being respectively positioned on the axes of revolution of said first and second reflectors, said first reflector subtending said one pair of arrays, and said second reflector subtending said other pair of arrays; and
   first and second masking means disposed respectively about a corresponding one of said sources and each being rotatble about a respective axis of its corresponding reflector so that the ratio of light quantities falling upon the respective arrays of each pair of arrays is set by the rotational position of the corresponding masking means.

10. An optical shaft encoder as defined in claim 8 wherein said light sources are mounted for movement for adjusting collimation of said beams, and including means for releasably locking said light sources and masking means in fixed positions.

References Cited

UNITED STATES PATENTS

| | | | |
|---|---|---|---|
| 2,992,322 | 7/1961 | Motter | 240—44.2 |
| 3,096,444 | 7/1963 | Seward | 250—231 |
| 3,148,582 | 9/1964 | Coakley | 350—296 |
| 3,194,967 | 7/1965 | Mash | 250—239 |
| 3,227,887 | 1/1966 | Messelt et al. | 250—220 |
| 3,309,525 | 3/1967 | Johnson | 250—231 |

RALPH G. NILSON, *Primary Examiner.*

M. ABRAMSON, *Assistant Examiner.*